Patented July 27, 1948

2,445,748

UNITED STATES PATENT OFFICE 2,445,748

PRODUCTION OF PENICILLIN

Milislav Demerec, Cold Spring Harbor, N. Y., assignor to the United States of America as represented by the Administrator, Civilian Production Administration No Drawing. Application September 16, 1946, Serial No. 697,380

2 Claims. (Cl. 195—36)

This invention relates to the production of antibiotic substances, and more particularly to the production of penicillin.

It is an object of this invention to produce penicillin in extremely high yields. Another object is to produce mutations of molds of the genus mycetes capable of yielding extremely large amounts of antibiotic substances. Other objects will appear hereinafter as the ensuing description proceeds.

These objects are accomplished in accordance with this invention wherein an antibiotic-yielding organism of the genus mycetes is subjected to controlled dosage with ultra-short-wave radiation at an intensity insufficient to kill such an organism but amply sufficient to produce chromosome rupture therein whereby a mutant is produced, and thereafter such a mutant is cultured in a suitable propagation medium whereby a high yield of antibiotic substance is secured. Suitable mold organisms of the genus mycetes for use in accordance with this invention include *Penicillium notatum*, *Penicillium chrysogenum*, Actinomyces, and similar mold organisms of the genus mycetes. Preferably, there is employed an already high-yielding strain of *Penicillium chrysogenum*.

Suitable short wave irradiation for the production of mutants includes ultra-violet irradiation, cosmic irradiation, atomic fission irradiation, and preferably X-ray irradiation. For each of the above types of irradiation a dosage is chosen such that chromosome rupture is accomplished without killing the organism. In the case of X-ray irradiation a suitable dosage has been found to be between 10,000 and 150,000 roentgen units, and preferably there is employed a dosage of between 50,000 and 100,000 roentgen units. Under this dosage, the mutation is brought about in the spore form of the organism principally. In irradiating a culture containing numerous spores with the selected dosage of irradiation, it is usually found that the viability of many of the organisms is detrimentally affected. However, numerous of the remaining organisms are found, upon subsequent culture, to be mutants of the parent strain. Obviously, for commercial use of penicillin in antibiotic substances only the mutant or mutants producing the highest yields are propagated.

After irradiation, the mutant spores are spread on the surface of a suitable potato-dextrose-agar culture medium and allowed to germinate. Upon germination, the germinated organisms are isolated into the standard liquid lactose-corn steep liquor culture medium, made in accordance with the formula of the Northern Regional Research Laboratory at Peoria, Illinois, as described in the Journal of the Elisha Mitchell Scientific Society, vol. 61, page 78, for August, 1945. Thereupon, the cultures are agitated for a period of from 2 to 12 days. The resulting growth of the mold is treated in any suitable way for the recovery of its antibiotic content. For example, it may be extracted with amyl acetate, then treated with a small amount of activated carbon to purify the extract, and then further extracted with aqueous acetone. After separation from the activated carbon and the amyl acetate, the aqueous acetone solution is evaporated to yield an aqueous solution of penicillin or other antibiotic substance. Thereupon, by careful evaporation crystalline penicillin can be secured as a residue.

The following illustrative example shows how the invention may be carried out, but it is not limited thereto:

A seven-day-old culture of *Penicillium chrysogenum* (strain NRRL 1951.B25), grown in a test tube having the approximate dimensions, 1 x 7.5 cm., on standard potato-dextrose-agar medium, was subjected to X-ray radiation of 75,000 roentgen units at a rate between 2,000 and 3,000 units per minute. The X-ray irradiation was carried out with a usual d-therapy type of equipment commonly used for cancer treatment. After irradiation, spores were collected from the culture and spread on the surface of a potato-dextrose-agar culture medium contained in a Petri dish where they were allowed to germinate. Immediately after germination, the spores were isolated in separate test tubes containing 2 cc. each of liquid lactose-corn-steep medium made in accordance with the formula of the Northern Regional Research Laboratory at Peoria, Illinois. Thereupon, the test tubes were placed in a shaker machine having a four-inch horizontal stroke and operated at 250 strokes per minute. Each test tube had an approximate inside diameter of 10 mm. and a length when stoppered of 110 mm. The tubes were stoppered and the shaking machine operated for five days, after which the contents of each tube were diluted with 100 volumes of distilled water and assayed in duplicate for penicillin content by the Oxford cup method, using *Staphylococcus aureus* (NRRL strain B313). The tubes which showed a high yield of penicillin were saved for bulk fermentation tests and the low-yielding cultures were discarded. The following table shows the diameter of the inhibited region in millimeters for each Oxford cup test and the asterisk indicates the high-yielding cultures which were retained:

| Culture No. / Plate | 1 | 2 | 3 | 4 | 5 | 6 |
|---|---|---|---|---|---|---|
| 1 | 15 | 13 | 20 | 24 | 7 | 21 |
| 2 | 15 | 12 | 20 | 22 | 14 | 21 |
| | 7 | 8 | 9 | 10 | 11 | 12 |
| 3 | 24 | 18 | 21 | 20 | 21 | 25 |
| 4 | *24 | 19 | 22 | 24 | 22 | *24 |
| | 13 | 14 | 15 | 16 | 17 | 18 |
| 5 | 19 | 15 | 16 | 15 | 16 | 17 |
| 6 | (¹) | 21 | 14 | 15 | 18 | 16 |
| | 19 | 20 | 21 | 22 | 23 | 24 |
| 7 | 15 | 15 | 26 | 25 | 24 | 18 |
| 8 | 14 | 15 | *24 | *25 | (¹) | 18 |
| | 25 | 26 | 27 | 28 | 29 | 30 |
| 9 | 22 | 20 | 15 | (¹) | 12 | 7 |
| 10 | 24 | 16 | 15 | 21 | 11 | 17 |
| | 31 | 32 | 33 | 34 | 35 | 36 |
| 11 | 20 | 17 | 13 | 23 | 24 | 21 |
| 12 | 24 | 20 | 12 | 17 | 17 | 20 |
| | 37 | 38 | 39 | 40 | 41 | 42 |
| 13 | 20 | 20 | 21 | 14 | 13 | 20 |
| 14 | 21 | 20 | 21 | 13 | 13 | 20 |
| | 43 | 44 | 45 | 46 | 47 | 48 |
| 15 | 24 | 21 | 20 | 25 | 18 | 25 |
| 16 | 20 | 20 | 19 | *28 | 18 | *23 |

¹ Leaked.

Each of the above high-yielding strains were then subjected to bulk fermentation on standard lactose-corn-steep-liquor medium and one of them was found to consistently rate 369 on the Oxford penicillin scale. By comparison, previous strains had yielded only 169 and 98, respectively.

It will be seen from the foregoing description that there has been provided a highly desirable technique for the production of mutants of antibiotic molds, as well as a process for producing penicillin in yields many times those previously secured.

Since many apparently differing embodiments of this invention will occur to one skilled in the art, various changes can be made without departing from the spirit and scope of this invention.

What is claimed is:

1. A process for the production of penicillin which comprises inoculating a growth medium with a fungus mutant produced by X-ray irradiation of *Penicillium chrysogenum* with 50,000 to 100,000 roentgen units, then agitating and aerating said medium at a temperature between 20° and 25° C. for about 4 to 12 days, and recovering penicillin from the resulting fungus growth.

2. The process of claim 1 wherein the *Penicillium chrysogenum* is exposed to about 75,000 roentgen units of X-ray irradiation.

MILISLAV DEMEREC.

REFERENCES CITED

The following references are of record in the file of this patent:

UNITED STATES PATENTS

| Number | Name | Date |
|---|---|---|
| 2,107,830 | Liebesny | Feb. 8, 1938 |

OTHER REFERENCES

Jahiel, Science, September 29, 1944, 195/P., page 298.

Bonner et al., Penicillin Research Progress Report #3, OPRD Contract #169, Department of Biology, Stanford University, April 25, 1944, pages 1 to 3.

Summary of Discussion at the Penicillin Technical Meeting, Hotel Astor, New York, January 21–22, 1944, pages 1 and 11.

Nadson et al., Comptes Rendus, Acad. des Sciences, T. 186, 1928, pages 1566 to 1568.